(12) United States Patent
Khayrallah

(10) Patent No.: US 8,750,860 B2
(45) Date of Patent: Jun. 10, 2014

(54) STALE FEEDBACK USING A SECONDARY BASE STATION

(75) Inventor: Ali S. Khayrallah, Mountain View, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 321 days.

(21) Appl. No.: 13/308,768

(22) Filed: Dec. 1, 2011

(65) Prior Publication Data

US 2012/0190400 A1 Jul. 26, 2012

Related U.S. Application Data

(60) Provisional application No. 61/434,995, filed on Jan. 21, 2011.

(51) Int. Cl.
*H04W 24/04* (2009.01)

(52) U.S. Cl.
USPC ........ 455/423; 455/452.2; 455/69; 455/67.11

(58) Field of Classification Search
USPC ........... 455/500, 524, 423, 452.1, 509, 452.2, 455/520, 66.1, 67.11, 67.7, 24, 69; 370/328, 329, 338
See application file for complete search history.

(56) References Cited

U.S. PATENT DOCUMENTS

| 2011/0243066 A1* | 10/2011 | Nayeb Nazar et al. | 370/328 |
| 2011/0299480 A1* | 12/2011 | Breit et al. | 370/329 |
| 2013/0223547 A1* | 8/2013 | Zhou et al. | 375/260 |

OTHER PUBLICATIONS

Mohammad Ali Maddah-Ali et al. "Completely Stale transmitter channel state information is still very useful." 48th Anuual Alterion Conference, Sep. 29, 2010, pp. 1188-1195, XP031899520. I.

* cited by examiner

*Primary Examiner* — John J Lee

(57) ABSTRACT

A system and method in which two base stations—a Primary Base Station (PBS) and a Secondary Base Station (SBS)—are used to accomplish a Virtual 2-antenna Receiver (V2RX) scheme. The PBS may perform the initial transmissions of symbols, but, instead of the PBS, the SBS may handle the subsequent reception of terminal-specific Channel State Information (CSI) and the broadcast of an additional signal. The SBS can be much simpler in design than the PBS, and can be located physically closer to the terminals, requiring less power for the feedback signals (from the terminals) and also for SBS's own broadcast of the additional signal to terminals. The reception and usage of stale CSI using a secondary base station can be important for dense networks with a large number of simple terminals. Because of the rules governing abstracts, this abstract should not be used to construe claims.

17 Claims, 4 Drawing Sheets

STALE FEEDBACK USING A SECONDARY BASE STATION

CROSS-REFERENCE TO RELATED APPLICATIONS

This application claims the priority benefit under 35 U.S.C. §119(e) of U.S. Provisional Application No. 61/434,995 filed on Jan. 21, 2011, the disclosure of which is incorporated herein by reference in its entirety.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

TECHNICAL FIELD

The present invention relates to indirect exchange of information between terminals in a wireless network via a base station in the network, for the purpose of improving the communication between the base station and the terminals. More particularly, and not by way of limitation, particular embodiments of the present invention are directed to a method and apparatus that facilitate creation of a Virtual 2-antenna Receiver (V2RX) at each terminal by dividing certain transmission and reception tasks between two base stations in the wireless network.

BACKGROUND

As mentioned above, terminals operating in a wireless network may exchange information via an intermediary device—e.g., a base station in the network. The exchange may be in the form of channel feedback for the communication channel or link (e.g., a Radio Frequency (RF) channel) (conveniently referred to herein as the "channel") between the base station and the wireless terminals. The channel feedback may include, for example, one or more of (i) a Channel Quality Indicator (CQI) indicating channel quality of the wireless communication channel between the base station and a User Equipment (UE); (ii) a Precoding Matrix Indicator (PMI) indicating a preferred precoding matrix for shaping the transmit signal; and (iii) a Rank Indicator (RI) indicating the number of useful transmission layers for the data channel as preferred by the UE. The channel feedback may also include estimates of channel coefficients, referred to herein as Channel State Information (or CSI).

The channel feedback may enable the base station to adaptively configure a suitable transmission scheme to improve coverage or user data rate or to more accurately "predict" channel quality for future transmissions to the terminals. In case of a mobile communication environment of Third Generation (3G) and Fourth Generation (4G) cellular networks, such as Third Generation Partnership Project's (3GPP) LTE network, the Evolved Universal Terrestrial Radio Access (EUTRA) or Evolved Universal Terrestrial Radio Access Network (E-UTRAN) air interface for LTE may require a base station to allocate resource blocks to a UE or terminal where the resource blocks are generated by dividing the system bandwidth in the frequency domain. A base station may transmit wireless channel resource allocation information to a mobile handset, terminal or UE via a downlink control signal, such as the Physical Downlink Control Channel (PDCCH) signal in 3GPP's 3G and 4G networks. In modern cellular networks (e.g., LTE), after receiving this PDCCH downlink transmission (i.e., transmission from a base station to a mobile device), the UE may feed back the CSI via uplink signaling (i.e., transmission from a mobile device to the base station) to the base station such as the Physical Uplink Control Channel (PUCCH) or the Physical Uplink Shared Channel (PUSCH).

In "Completely Stale Transmitter Channel State Information is Still Very Useful," by M. Maddah-Ali and D. Tse, Allerton Conference, 2010 (referred to hereinafter as "Paper-1"), a multi-user downlink Multiple Input Multiple Output (MIMO) scheme is described with a mechanism for information exchange between single-antenna terminals, wherein the terminals feed back CSI to the serving base station. The serving base station exploits this CSI to broadcast an additional signal, which each terminal uses to create a Virtual 2-antenna Receiver (V2RX). The benefit of the V2RX may include a boost in performance for each terminal, which can translate into better coverage, higher bit rate, higher cell throughput (e.g., in case of a cellular wireless network), etc.

FIG. 1 illustrates an exemplary arrangement 10 in which a base station 12 facilitates information exchange between two terminals 14, 15 to form a V2RX at each terminal. The base station 12 may have two transmit/receive antennas (not shown)—herein referred to as "antenna-1" and "antenna-2," and may transmit information to two terminals (i.e., terminal A 14 and terminal B 15 in FIG. 1) operating in the wireless network served by the base station 12. The arrows 17 and 18 indicate such transmissions from the base station 12 to respective terminals 14-15. Each terminal 14-15 may have only a single receive antenna (RX antenna) and can communicate back with the base station 12, but cannot communicate directly with the other terminal (as indicated by an "X" mark on the dotted arrow 20). However, as discussed below, the terminals 14-15 may be able to exchange information with each other via the base station 12 as indicated by exemplary dotted arrows 22-23, which show, by way of an example, terminal B sending information to terminal A via base station 12 in FIG. 1. Similarly, although not shown by any dotted arrows in FIG. 1, terminal A may send information to terminal B via base station 12.

At time 1, the base station 12 may transmit symbols $u_A$ (via antenna-1) and $v_A$ (via antenna-2) intended for terminal A, which receives:

$$y_A[1] = h_{A,1}[1]u_A + h_{A,2}[1]v_A + z_A[1] \qquad (1)$$

where $h_{A,1}[1]$ and $h_{A,2}[1]$ are antenna-specific channel responses associated with terminal A (i.e., channel responses from base station antenna-1 and antenna-2, respectively, to terminal A), and $z_A[1]$ is the channel noise associated with terminal A. As used herein, the term "symbol" may refer to information content transmitted by a single antenna in a single transmission from the base station 12 to one or more terminals over the communication channel between the base station and the terminal(s). In case of an LTE network, for example, such transmission may include a radio sub-frame, or transmission time interval (TTI), having one or more slots (not shown). Terminal A 14 can try to recover $u_A$ and $v_A$ from $y_A[1]$ using a method discussed below after equation (7). Being in the same communication environment, terminal B 15 is also "listening" to the transmission from the base station 12 to terminal A 14, and receives:

$$y_B[1] = h_{B,1}[1]u_A + h_{B,2}[1]v_A + z_B[1] \qquad (2)$$

where $h_{B.1}[1]$, $h_{B.2}[1]$ and $z_B[1]$ relate to terminal B and are defined similarly to terminal A-related parameters mentioned above. If terminal A also had access to $y_B[1]$, it would use it along with $y_A[1]$ to form a 2-antenna receiver (V2RX), boosting its performance significantly. However, as mentioned earlier, terminal B cannot talk directly to terminal A (as symbolically represented by crossed-out dotted arrow 20). Thus, in the arrangement of FIG. 1, terminal B communicates indirectly with terminal A through the base station (as indicated by dotted arrows 22-23), allowing terminal A to form a Virtual 2-antenna Receiver (V2RX) as discussed below. Similarly, terminal A helps terminal B form its own virtual 2-antenna receiver. This process is explained below.

At time 2, the base station 12 may transmit symbols $u_B$ (via antenna-1) and $v_B$ (via antenna-2) intended for terminal B, which receives:

$$y_B[2]=h_{B.1}[2]u_B+h_{B.2}[2]v_B+z_B[2] \quad (3)$$

Here, terminal A 14 is also "listening" to base station's 12 transmission to terminal B 15, and receives:

$$y_A[2]=h_{A.1}[2]u_B+h_{A.2}[2]v_B+z_A[2] \quad (4)$$

where the channel responses (h[t]) and the noise terms (z[t]) are defined as above.

In the arrangement 10 in FIG. 1, before time 3, terminal B 15 feeds back estimates of antenna-specific parameters $h_{B.1}[1]$ and $h_{B.2}[1]$ to the base station 12. Similarly, before time 3, terminal A 14 also feeds back estimates of $h_{A.1}[2]$ and $h_{A.2}[2]$. The terminals A and B may provide these feedbacks via respective CSI reports to the base station 12. At time 3, the base station may form a new combined symbol $$w_{AB}=h_{A.1}[2]u_B+h_{A.2}[2]v_B+h_{B.1}[1]u_A+h_{B.2}[1]v_A \quad (5)$$

which it may transmit (to both terminals A and B) from antenna-1 only, for simplicity. It is noted here that $w_{AB}$ may contain very useful information for both terminals A and B, provided they are able to parse it out. Now focusing on terminal A, it is observed that terminal A receives:

$$y_A[3]=h_{A.1}[3]w_{AB}+z_A[3] \quad (6)$$

In response, terminal A can form a virtual second antenna signal using $y_A[3]$ (from equation (6) above) and $y_A[2]$ (from equation (4) above), suppressing the contributions of $u_B$ and $v_B$. This virtual second antenna signal can be given by:

$$\begin{aligned}y'_A[3] &= y_A[3] - h_{A,1}[3]y_A[2] \\ &= h_{A,1}[3]h_{B,1}[1]u_A + h_{A,1}[3]h_{B,2}[1]v_A + \\ &\quad z_A[3] - h_{A,1}[3]z_A[2]\end{aligned} \quad (7)$$

Together, $y_A[1]$ and $y'_A[3]$ form a V2RX for terminal A. Thus, in effect, terminal A "sees" a 2×2 MIMO unicast scenario, and can use any appropriate method to recover $u_A$ and $v_A$. In essence, with two observations $y_A[1]$ and $y'_A[3]$, terminal A has enough degrees of freedom to solve for the two unknown transmitted symbols $u_A$ and $v_A$. This can be done through, for example, maximum likelihood detection, which jointly hypothesizes the values of $u_A$ and $v_A$ to find the most likely combination given the observation of $y_A[1]$ and $y'_A[3]$. Another example is successive interference cancellation, in which symbol $u_A$ is detected first, treating the contribution from $v_A$ as interference. After detecting $u_A$, the interference contributed by $u_A$ is then cancelled from $y_A[1]$ and $y'_A[3]$. The cleaned-up signal is used to detect $v_A$. The detection order of $u_A$ and $v_A$ may be reversed. FIG. 2 symbolically illustrates such 2×2 MIMO unicast scenario at terminal A with an "X" over the transmission 18 from base station 12 to terminal B 15 to indicate terminal A's suppression of contributory effect of $u_B$ and $v_B$ to form V2RX (as mentioned earlier). It is noted here that FIG. 2 is a symbolic illustration only; there is no suppression of actual transmission from base station 12 to terminal B.

Similarly, at time 3, terminal B receives:

$$y_B[3]=h_{B.1}[3]w_{AB}+z_B[3] \quad (8)$$

and combines it with $y_B[1]$ (from equation (2) above) to form a virtual second antenna for terminal B, suppressing the contributions of $u_A$ and $v_A$. It is noted here that an equation similar to equation (7) can be obtained for terminal B as well, however such equation is not presented herein for the sake of brevity. As in case of terminal A, terminal B also "sees" a 2×2 MIMO unicast scenario and can recover $u_B$ and $v_B$ using an appropriate method as mentioned above. Like FIG. 2, FIG. 3 symbolically illustrates such 2×2 MIMO unicast scenario at terminal B with an "X" over the transmission 17 from base station 12 to terminal A 14 to indicate terminal B's suppression of contributory effect of $u_A$ and $v_A$ to form V2RX. It is noted here that FIG. 3 is a symbolic illustration only; there is no suppression of actual transmission from base station 12 to terminal A.

Overall, the communication scheme in the arrangement of FIG. 1 requires 3 channel uses (at times t=1, 2, 3) to transmit 4 symbols ($u_A$, $v_A$, $u_B$, and $v_B$). In that sense, there is a gain, which is identified as a gain in degrees of freedom in Paper-1.

The above-discussed V2RX creation scenario generalizes readily to a base station with M>2 antennas and M single-antenna terminals. The scenario also generalizes readily to terminals with N>1 receive antennas.

SUMMARY

As discussed above, a base station may facilitate information exchange/feedback between two terminals to enable each terminal to form a V2RX. Via CSI reports to the base station, each terminal may indirectly supply to the other terminal information "received" from the base station when the supplying-terminal is not the primarily-intended recipient of the information transmitted from the base station. Such feedback of additional information enables the other terminal to more robustly receive transmissions from the base station.

In Paper-1, it is assumed that each CSI received by the base station from a terminal in the wireless network is stale, in the sense that the channel (between the base station and the terminals) may have changed completely by the time the base station transmits the extra signal (i.e., the combined symbol given by equation (5) above). Nevertheless, the CSI feedback remains useful because of the multi-user nature of the scenario—even when the feedback is treated as totally stale. However, the utility of stale feedback is diminished by the arrangement in the scheme in Paper-1 where the base station remains occupied for an extra transmission time (i.e., to transmit the combined symbol given by equation (5) above) as well as for the reception of CSI feedbacks from the terminals A and B. This prevents the base station from doing other important tasks.

It is therefore desirable to devise a methodology that exploits the stale CSI feedbacks in a V2RX scheme or a similar scheme involving indirect communication between two wireless terminals, without significantly occupying the serving base station.

Particular embodiments of the present invention provide a solution to the above-mentioned problem faced by the serving base station in a V2RX scheme. The present disclosure proposes usage of two base stations—a Primary Base Station (PBS) and a Secondary Base Station (SBS)—to perform the tasks originally performed by a single serving base station in the scheme of Paper-1. The PBS may perform the initial transmissions (of symbols $u_A$ and $v_A$ at time 1, and of symbols $u_B$ and $v_S$ at time 2), but, instead of the PBS, the SBS may handle the subsequent reception of terminal-specific CSI and the broadcast of the additional signal (i.e., the combined symbol in equation (5)). This division of tasks between the PBS and SBS may free up the PBS to do its main tasks (e.g., processing of information for terminals, preparing symbols to be transmitted to terminals, managing multiple terminals in the wireless network, communicating with other non-terminal entities in the wireless network, etc.) instead of being occupied with handling feedbacks and assisting terminals to form V2RX. Because SBS's role is limited, the SBS can be much simpler in design than the PBS. Furthermore, the SBS can be located physically closer to the terminals, requiring less power for the feedback signals (from the terminals) and also for SBS's own broadcast of the additional signal (i.e., the combined symbol in equation (5)) to terminals. This lower power requirement can effectively help the overall performance of the cell (e.g., in a cellular wireless network) in which the PBS and SBS are operating.

In one embodiment, the present invention is directed to a method of providing wireless transmissions in a wireless network wherein a first base station and a second base station are in wireless communication with each of a first terminal and a second terminal operating in the wireless network. The first base station includes a pair of transmit antennas. The method comprises the steps of: using the first base station, providing a terminal-specific wireless transmission to each of the first and the second terminals over a communication channel established in the wireless network; and, using only the second base station, receiving respective terminal-specific channel status-related information from at least one of the first and the second terminals in response to corresponding terminal-specific wireless transmission from the first base station.

In a further embodiment, the present invention is directed to an improvement to a method of forming a respective V2RX at a first terminal and a second terminal that are in wireless communication with a first base station via a communication channel established in a wireless network. The improvement comprises: providing a second base station in the wireless network, wherein the second base station is in wireless communication with the first and the second terminals; and configuring the second base station to receive a respective CSI feedback from each of the first and the second terminals, wherein each respective CSI feedback relates to a terminal-specific transmission to a corresponding one of the first and the second terminals from the first base station over the communication channel, and wherein each terminal-specific transmission temporally precedes the respective terminal-specific CSI feedback.

In a further embodiment, the present invention is directed to a system that comprises a first communication node; and a second communication node. The first communication node is configured to be in wireless communication with each of a first terminal and a second terminal operating in a wireless network, and wherein the first communication node is further configured to provide a terminal-specific wireless transmission to each of the first and the second terminals over a communication channel established in the wireless network. The second communication node is configured to be in wireless communication with each of the first and the second terminals, and wherein the second communication node is further configured to receive respective terminal-specific CSI feedback from at least one of the first and the second terminals in response to corresponding terminal-specific wireless transmission from the first communication node.

The usage of a secondary base station (SBS) according to the teachings of the present disclosure can be an important enabler for dense networks with a large number of simple terminals. For example, such terminals may be sensors for various machine-to-machine applications (e.g., sensors (e.g., wireless picture or video cameras) on a train or a bus, sensors attached to home electrical meters to wirelessly report the meter reading, sensors placed on ground (e.g., for monitoring and wirelessly reporting seismic activity), etc.), as opposed to full-fledged phones (e.g., cellular telephones or smartphones). Such terminals are likely to be small and cheap, with a single antenna (for transmission as well as reception), a noisy front end, limited processing capability, and slow feedback. This makes the boost in terminals' as well as overall system's performances afforded by the particular embodiments of the present invention particularly useful.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that although the invention is described primarily in the context of a dense wireless network with a large number of simple terminals, the invention can be implemented in other forms of wireless networks as well (for example, a corporate-wide wireless data network, a satellite communication network, a cellular telephone/data network, and the like).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "pre-determined," "antenna-1", etc.) may be occasionally interchangeably used with its non-hyphenated version (e.g., "predetermined," "antenna 1," etc.), and a capitalized entry (e.g., "Terminal") may be interchangeably used with its non-capitalized version (e.g., "terminal"). Such occasional interchangeable uses shall not be considered inconsistent with each other.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing voice information or non-voice data/control information) to the second entity regardless of the type (analog or digital) of those signals. It is further noted that various figures (including network diagrams or component diagrams) shown and discussed herein are for illustrative purpose only, and are not drawn to scale.

Figure 1:
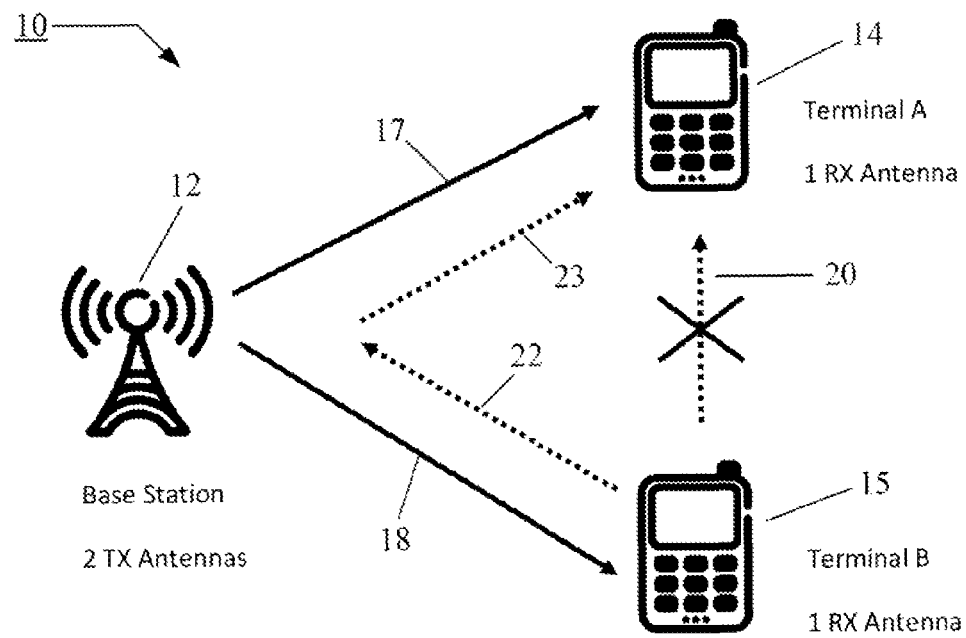
FIG. 1 illustrates an exemplary arrangement in which a base station facilitates information exchange between two terminals to form a Virtual 2-antenna Receiver (V2RX) at each terminal.
Figure 4:
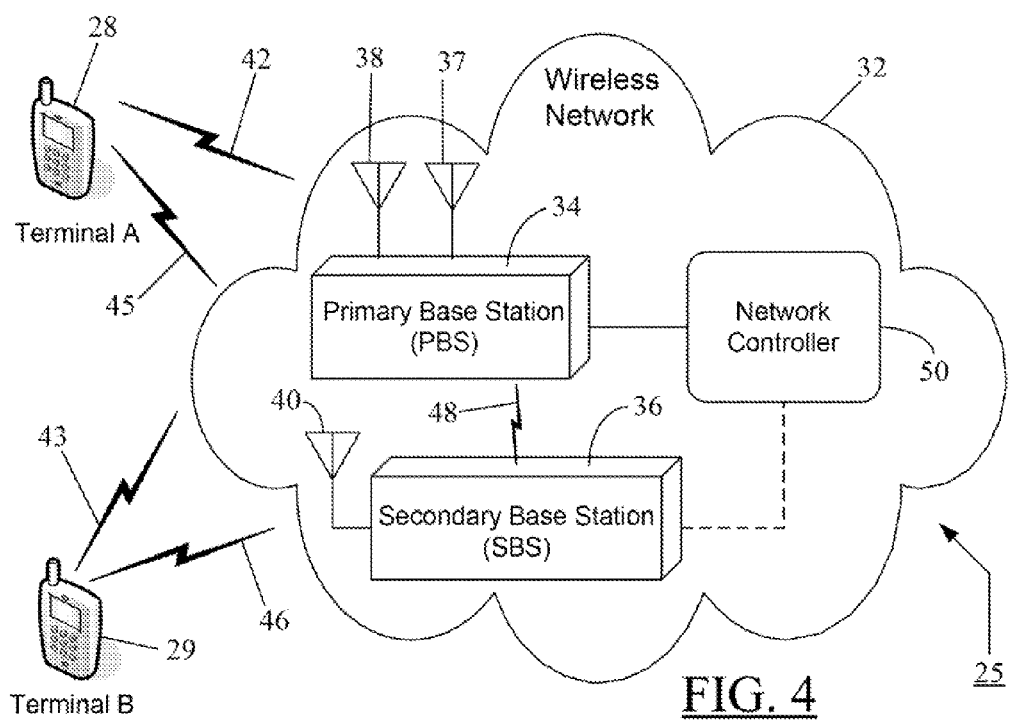
FIG. 4 is a diagram of an exemplary wireless system in which two base station-based V2RX methodology according to the teachings of one embodiment of the present invention may be implemented.

FIG. 4 is a diagram of an exemplary wireless system 25 in which two base station-based V2RX methodology according to the teachings of one embodiment of the present invention may be implemented. The system 25 may include two wireless terminals—terminal A 28 and terminal B 29—that are in wireless communication with a wireless network 32 through two base stations in the network 32—a Primary Base Station (PBS) 34 and a Secondary Base Station (SBS) 36. It is noted here that a base station may be interchangeably referred to herein as a "communication node" or "node". The network 32 may be operated, managed, owned by a wireless service provider (or operator). At least one of the base stations 34, 36 may be, for example, a base station in a 3G network, or an evolved Node-B (eNodeB or eNB) or Home eNodeB (HeNB) when the carrier network is a Long-Term Evolution (LTE) network, or any other home base station or femtocell, and may provide radio interface (e.g., an RF channel) to the wireless terminals 28-29. In other embodiments, at least one of the base stations 34, 36 may also include a site controller, an access point (AP), or any other type of radio interface device capable of operating in a wireless environment. It is noted here that the terms "mobile handset," "wireless handset," "terminal," "wireless terminal," and "User Equipment (UE)" may be used interchangeably herein to refer to a wireless communication device that is capable of voice and/or data communication via a carrier network. Similarly, the terms "wireless network" or "carrier network" may be used interchangeably herein to refer to a wireless communication network (e.g., a cellular network, a proprietary data communication network, a corporate-wide wireless network, etc.) facilitating voice and/or data communication with two user equipments (UEs). Like terminals 14-15, in the embodiment of FIG. 1, each terminal 28-29 may be a terminal with a single antenna (performing both transmission and reception) and can communicate back with the base stations 34, 36, but cannot communicate directly with the other terminal. However, contrary to the single base station-based information exchange in the embodiment of FIG. 1, the terminals 28-29 in the embodiment of FIG. 4 may (indirectly) exchange information with each other via two base stations 34, 36 as discussed in more detail hereinbelow. In another embodiment, each terminal 28-29 may have N>1 receive antennas. In the exemplary embodiment of FIG. 4, the PBS 34 is shown to include two antennas—antenna-1 identified by reference numeral "37" and antenna-2 identified by reference numeral "38", each of which could perform transmission and reception. The SBS 36 may have one transmit (TX) antenna 40, which could also perform as a receive antenna. Although not shown in FIG. 4, the SBS 40 may have any number of receive antennas. In other embodiments, the wireless network 32 may have a number M>2 of wireless terminals (e.g., single-antenna terminals) participating in the information exchange, in which case the PBS 34 may have M>2 transmit antennas and the SBS 40 may have any number of receive antennas.

In yet other embodiments, there may be a number of pairs of terminals (or groups of M>2 terminals) in the cell served by the PBS, where each pair of terminals (or group of M terminals) may be involved in an information exchange. This can happen simultaneously with the benefit of time division, frequency division, code division, etc. There also may be other active terminals (not shown) in the cell served by the PBS, but those terminals may not be participating in the information exchange. For ease of discussion, only two single-antenna terminals 28-29 served by one two-antenna PBS 34 and one single-antenna SBS 36 are shown in FIG. 4. It is observed here that the terminals 28-29 may be stationary or mobile.

As mentioned before, in one embodiment, the terminals 28-29 may be simple terminals with limited processing capability. For example, the terminals 28-29 may be sensors for various machine-to-machine applications (e.g., sensors (e.g., wireless picture or video cameras) on a train or a bus sending data to a base station that also may be on the train or bus, sensors attached to home electrical meters to wirelessly report the meter reading to a mobile base station (e.g., on a utility truck), sensors placed on ground (e.g., for monitoring and wirelessly reporting seismic activity) and communicating with a stationary or mobile (e.g., on an airplane) base station), as opposed to full-fledged phones (e.g., cellular telephones or smartphones). Such terminals may be small and cheap, with a single antenna (for transmission as well as reception). However, the teachings of certain embodiments of the present invention may also be used in conjunction with other more-sophisticated mobile handsets such as, for example, modern cellular telephones or data transfer equipments (e.g., a Personal Digital Assistant (PDA) or a pager), smartphones (e.g., iPhone™, Android™, Blackberry™, etc.), computers, Universal Serial Bus (USB) powered sensors, or any other type of user devices capable of operating in a wireless environment.

Figure 2:
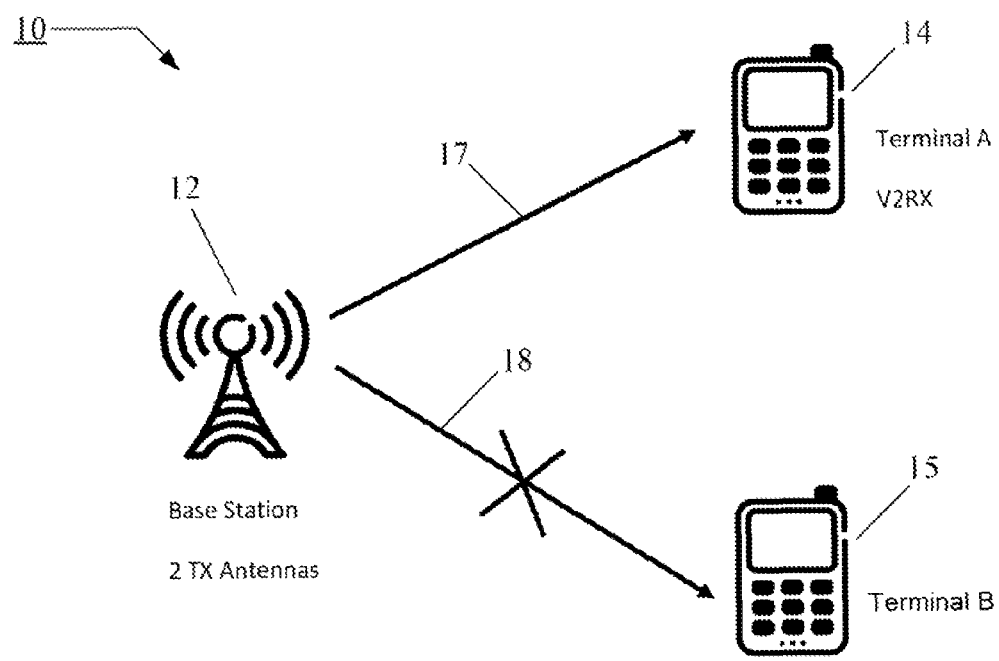
FIG. 2 symbolically illustrates a 2×2 MIMO unicast scenario at terminal A with an "X" over the transmission from base station to terminal B to indicate terminal A's suppression of contributory effect of transmission to terminal B in forming V2RX.
Figure 3:
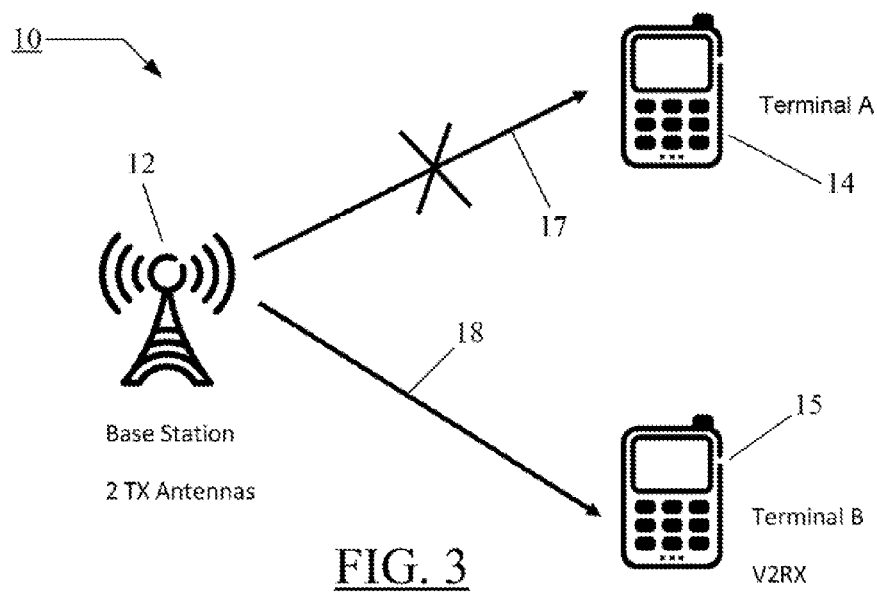
FIG. 3 symbolically illustrates a 2×2 MIMO unicast scenario at terminal B with an "X" over the transmission from base station to terminal A to indicate terminal B's suppression of contributory effect of transmission to terminal A in forming V2RX.

In FIG. 4, terminals 28-29 are shown to be in communication with the PBS via respective wireless links 42, 43, and with the SBS via respective wireless links 45, 46. These wireless links 42-43 and 45-46 may be Radio Frequency (RF) links and may represent an air interface or wireless communication channel (e.g., an RF channel). It is noted here that the term "channel," as used herein, may refer to a single, physical over-the-air interface between the base stations 34, 36 and terminals 28-29. However, between any two points (e.g., a transmit antenna and a receive antenna), there may be a specific effective channel response, summarizing all the signal losses, signals bouncing off of obstacles, etc. This effective channel response between any such two points may be represented by a "channel coefficient." Thus, as an example with reference to the earlier discussion of FIGS. 1-3, two transmit antennas (on the base station 12) and two receive antennas (one on each terminal 14, 15) may be represented by four channel coefficients—$h_{A.1}$, $h_{A.2}$, $h_{B.1}$, and $h_{B.2}$.

The SBS 36 may be wirelessly linked with the PBS 34 to enable it to "listen" to the PBS 34. As mentioned before, the SBS 36 is also in wireless communication with the terminals 28-29. In one embodiment, the SBS 36 may be in communication with the PBS 34 via wireline and/or wireless means. In FIG. 4, the SBS 36 is shown to be wirelessly connected to the PBS 34 via an RF link 48 to enable the SBS 36 to receive wireless transmissions and control signals from the PBS 34 (as discussed below). In one embodiment, the SBS 36 may be controlled by the PBS 34, in which case the SBS 36 may also communicate to PBS 34, for example, any malfunction or abnormality arising in SBS's communications (also discussed below) with the terminals 28-29. In another embodiment, the SBS 36 may be controlled by another base station (not shown), while the SBS 36 and the PBS 34 serve the same terminals. In this case, the SBS 36 may not explicitly communicate with the PBS 34, but may just "listen" to the PBS. In addition to providing air interface or wireless channel (e.g., as represented by wireless links 42-43 in FIG. 4) to the terminals 28-29 via antennas 37-38, the PBS 34 may also perform radio resource management (as, for example, in case of an eNodeB or HeNB in an LTE system), monitoring and control of the SBS 36 (when needed), processing of information for terminals 28-29, preparing symbols to be transmitted to terminals 28-29, managing multiple terminals (i.e., terminals in addition to the terminals 28-29) in the wireless network 32, communicating with other non-terminal entities (e.g., a network controller 50 discussed below) in the wireless network 32, etc. In case of a 3G carrier network 32, the communication node 34 may include functionalities of a 3G base station along with some or all functionalities of a 3G Radio Network Controller (RNC). Communication nodes in other types of carrier networks (e.g., 4G networks and beyond) also may be configured similarly. In one embodiment, the base stations 34 and 36 may be configured (in hardware, via software, or both) to jointly implement the stale CSI usage methodology as discussed herein. For example, when existing hardware architecture of either of the base stations 34, 36 cannot be modified, the stale CSI usage methodology according to one embodiment of the present invention may be implemented through suitable programming of a corresponding processor (e.g., processor 80 (or, more particularly, processing unit 87) in FIG. 8) in the communication node 34, 36. The execution of the program code (by a respective processor in the node 34, 36) may cause the processor to perform corresponding base station-specific tasks discussed hereinbelow with reference to FIG. 5. Thus, in the discussion below, although the base stations 34, 36 may be referred to as "performing," "accomplishing," or "carrying out" a function or process, it is evident to one skilled in the art that such performance may be technically accomplished in hardware and/or software as desired. Similarly, the terminals 28-29 may be suitably configured (in hardware and/or software) to receive the transmissions from the base stations 34 and 36, recover the transmitted symbols, and provide CSI reports to the SBS 36.

The carrier network 32 may include a network controller 50 coupled to the primary base station 34 and providing logical and control functions (e.g., terminal mobility management, access to external networks or communication entities, etc.) in the network 32. In case of an LTE carrier network, the network controller 50 may be a core network including an Access Gateway (AGW). Regardless of the type of carrier network 32, the network controller 50 may function to provide connection of the PBS 34 to other terminals (not shown) operating in the carrier network 32 and also to other communication devices (e.g., wireline or wireless phones, computers, monitoring units, etc.) or resources (e.g., an Internet website) in other voice and/or data networks (not shown) external to the carrier network 32. In that regard, the network controller 50 may be coupled to a packet-switched network (e.g., an Internet Protocol (IP) network such as the Internet) (not shown) as well as a circuit-switched network (not shown) such as the Public-Switched Telephone Network (PSTN) to accomplish the desired connections beyond the carrier network 32. In one embodiment, the network controller 50 may be optionally coupled to the SBS 36 as well (as indicated by a dotted connection in FIG. 4). In one embodiment, for example, in case of a network with a large number of different types of terminals, the PBS 34 may be configured to act as an SBS for another PBS (not shown) in the network. In another embodiment, the SBS 36 may be configured to act as an SBS for two or more PBS's in the network.

The carrier network 32 may be a cellular telephone network or a non-cellular wireless network (whether voice network, data network, or both). Furthermore, portions of the carrier network 32 may include, independently or in combination, any of the present or future wireline or wireless communication networks such as, for example, the PSTN, or a satellite-based communication link. Similarly, as also mentioned above, the carrier network 32 may be connected to the Internet via its network controller's 50 connection to an IP (packet-switched) network (not shown) or may include a portion of the Internet as part thereof.

Figure 5:
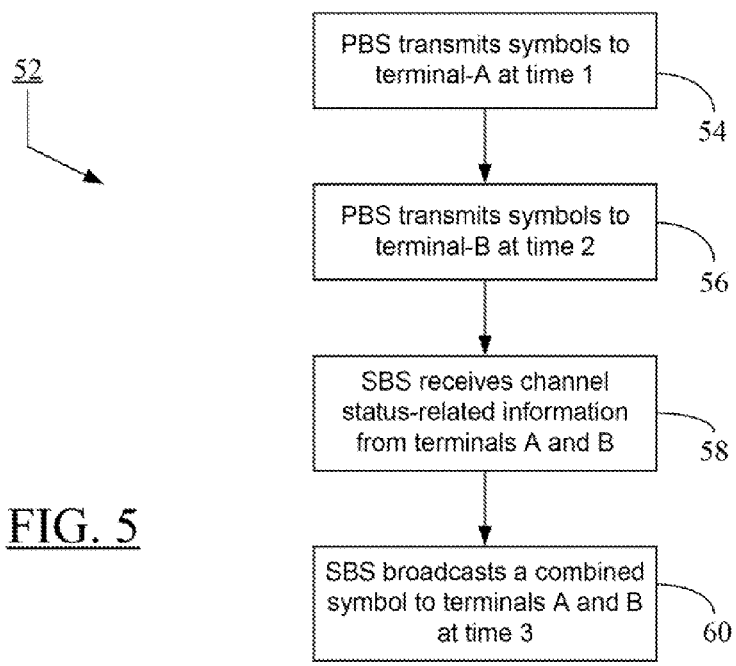
FIG. 5 depicts an exemplary flowchart related to sharing of tasks between the primary base station and the additional secondary base station according to one embodiment of the present invention.

FIG. 5 depicts an exemplary flowchart 52 related to sharing of tasks between the primary base station 34 and the additional secondary base station 36 according to one embodiment of the present invention. The flowchart 52 is discussed briefly here, and various blocks in the flowchart 52 are discussed in more detail later hereinbelow. As shown at block 54 in FIG. 5, at time 1, the PBS 34 may transmit symbol $u_A$ to terminal A 28 using antenna-1 (i.e., antenna 37 in FIG. 4) and symbol $v_A$ to terminal A using antenna-2 (i.e., antenna 38 in FIG. 4). Terminal A may receive the signal indicated at equation (1) and terminal B 29 may indirectly "receive" the signal indicated at equation (2) as discussed hereinbefore. As per block 56 in FIG. 5, at time 2, the PBS 34 may transmit symbols $u_B$ and $v_B$ to terminal B via antennas 37, 38, respectively. In this case, the receptions at terminals B and A are given by equations (3) and (4) discussed hereinbefore. The terminals 28-29 may be configured to provide their respective CSI feedbacks (containing antenna-specific parameters given in equations 2 and 4 as discussed hereinbefore) to SBS 36 (and not to the PBS 34, as in case of the single base station-based embodiment discussed in Paper-1). Thus, before time 3, the SBS 36 receives these CSI feedbacks from terminals A and B as indicated at block 58. Each terminal-specific CSI feedback may correspond to those antenna-specific transmissions from the PBS 34 that were sent to the other terminal and that time-wise precede the current terminal-specific feedback. For example, the CSI feedback from terminal B 29 related to time 1 may correspond to all antenna-specific transmissions from PBS's 34 antennas 1 and 2 (i.e., antennas 37-38 in FIG. 4) to terminal A at time 1, and so on, as discussed earlier with reference to equations (1) through (5). Thereafter, at time 3, the SBS 36 (and not the PBS 34, as in case of the single base station-based embodiment discussed in Paper-1) may form the combined symbol $w_{AB}$ (given by equation (5)) and broadcast it to both of the terminals 28-29 as indicated at block 60 in FIG. 5. The terminals 28-29 may then form respective V2RX as discussed earlier in conjunction with equations (6) through (8).

Figure 6:
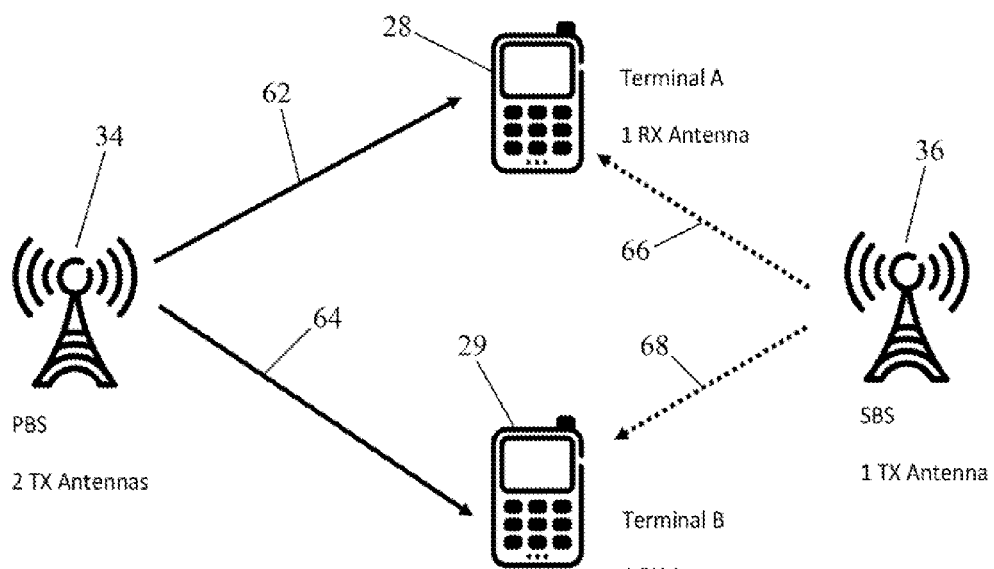
FIG. 6 is a simplified illustration of a stale feedback scenario with the additional secondary base station according to one embodiment of the present invention.

FIG. 6 is a simplified illustration of a stale feedback scenario with the additional secondary base station 36 according to one embodiment of the present invention. The initial transmissions (of symbols $u_A$, $v_A$, $u_B$, and $v_B$) from the PBS 34 at times 1 and 2 (as represented by blocks 54 and 56 in FIG. 5) are illustrated by exemplary arrows 62 and 64, respectively. It is noted here that the SBS 36 may be able to receive PBS's transmissions to terminals 28-29 at times 1 and 2 because of a number of reasons, such as, for example, SBS being in physical proximity of the terminals 28-29, SBS operating in the same communication channel as that established between the PBS 34 and the terminals 28-29, etc. As mentioned earlier, the SBS 36 may have any number of receive antennas, and one transmit antenna. For notational simplicity, the case of SBS having a single receive antenna is described now. At times 1 and 2, the SBS 36 may receive:

$$y_S[1] = h_{S.1}[1]u_A + h_{S.2}[1]v_A + z_S[1] \quad (9)$$

and $$y_S[2] = h_{S.1}[2]u_B + h_{S.2}[2]v_B + z_S[2] \quad (10)$$

where $h_{S.1}[1]$, $h_{S.2}[1]$, $h_{S.1}[2]$ and $h_{S.2}[2]$ are antenna-specific channel responses associated with the SBS 36 (i.e., channel responses from PBS antenna-1 (i.e., antenna 37 in FIG. 4) and antenna-2 (i.e., antenna 38 in FIG. 4), respectively, to SBS 36), and $z_S[1]$ and $z_S[2]$ are channel noises (at times 1 and 2, respectively) associated with the SBS 36. Upon receiving the signals in equations (9) and (10), the SBS 36 may use any appropriate method (e.g., a method discussed earlier after equation (7)) to recover the symbols $u_A$, $v_A$, $u_B$ and $v_B$ therefrom. It may be assumed here that the symbols are recovered correctly with very high probability, and SBS can treat them as being correct. This may be a reasonable assumption if the SBS 36 is at an advantaged location compared to the terminals 28-29, and thus experiences a much higher quality of reception (of transmissions from the PBS 34). For example, the SBS may be attached to a street light, to a side of a building, etc. However, if SBS 36 is operating in an environment (e.g., an unusually noisy channel) where it may be unable to correctly recover all the symbols $u_A$, $v_A$, $u_B$ and $v_B$ significantly consistently, then, in one embodiment, the SBS 36 may be provided with decoding capability to decode the symbols received from the PBS 34 and reconstruct the transmitted symbols from the decoded content. This additional decoding capability may improve SBS's reliability, but may also increase its complexity and decrease its responsiveness (i.e., it may add further processing delay at the SBS 36). In another embodiment, instead of a decoder (not shown) having the decoding capability, the SBS 36 may be configured to use "soft" estimates of the symbols. In this embodiment, the SBS 36 may compute expected values of the symbols $u_A$, $v_A$, $u_B$ and $v_B$—e.g., using estimates of the probability distribution over the constellation of each received symbol. Then the SBS 36 forms the new combined symbol using the soft symbol estimates or the decoded/reconstructed content mentioned earlier.

As mentioned earlier, instead of feeding back respective CSI to the PBS 34 (as is the case in the single base station-based scheme discussed in Paper-1), terminals A and B now transmit their CSI (containing estimates of respective antenna-specific parameters $h_{B.1}[1]$, $h_{B.2}[1]$, $h_{A.1}[2]$, $h_{A.2}[2]$ and $h_{A.2}[2]$, as mentioned earlier with reference to discussion related to equation (5)) to SBS 36. Thus, at time 3, SBS 36 has all the information necessary to form the combined symbol $w_{AB}$ given in equation (5)—i.e., SBS 36 has terminal-specific CSI feedbacks providing estimates of antenna-specific parameters $h_{B.1}[1]$, $h_{B.2}[1]$, $h_{B.2}[1]$, $h_{A.1}[2]$ and $h_{A.2}[2]$, and the content of the PBS-transmitted symbols $u_A$, $v_A$, $u_B$ and $v_B$ obtained through symbol recovery, decoding, or estimation as mentioned earlier. The SBS 36 then transmits the combined symbol to terminals A and B at time 3, as indicated by dotted arrows 66 and 68 in FIG. 6. The reception and processing of the combined symbol $w_{AB}$ at terminals A and B remains the same as that described earlier with reference to equations (6) through (8). It is observed here that, in one embodiment, the transmissions from the PBS 34 to the terminals 28-29 may employ one or more frequencies from a first set of RF frequencies, whereas the transmissions from the SBS 36 to the terminals 28-29 may use frequencies from a second (different) set of RF frequencies. Furthermore, in other embodiments, transmissions from the SBS 36 may use a different resource block (group of time/space building units in a subframe), or a different code in a Code Division Multiple Access (CDMA) scheme, etc., than transmissions from the PBS 34.

The use of SBS 36 to handle the reception of terminal-specific CSI feedbacks and the broadcast of the additional signal (i.e., the combined symbol $w_{AB}$) may be advantageous in many situations. For example, for reception of CSI feedbacks, the SBS 36 may generally only need a simplified receiver, not requiring decoding. Also, to broadcast of the combined symbol, the SBS 36 may only need a simplified transmitter with a single transmit chain, and no encoder. Thus, the design of the SBS 36 may be significantly less complex than that of the PBS 34. However, as mentioned earlier, there may be exceptional circumstances when such simple design of SBS 36 may have to be modified—e.g., when the operating environment necessitates employing a decoder or estimator in the SBS 36 to accurately obtain the PBS-transmitted symbols for construction of the combined symbol $w_{AB}$. As another example, if the SBS 36 is physically close to the terminals 28-29 (e.g., the SBS and the terminals in the same car or inside the same room), then the feedback transmissions (from the terminals 28-29) may require less power from the terminals. Usage of less power for such uplink transmissions may be good for uplink capacity, and may be quite beneficial for simple terminals that may not have access to electrical outlets or other continuous source of power (e.g., the terminals may be small and battery-operated). Also, because of SBS's physical proximity to the terminals 28-29, the additional broadcast signal (containing the combined symbol $w_{AB}$) from the SBS 36 may also require less power, which may improve downlink capacity as well and may be important if the SBS itself has limited access to power.

As a further example of how an SBS-based arrangement could be useful, it is observed that, in one embodiment, the SBS 36 may be moving along with the terminals 28-29. This could be the case for an SBS placed on a train or a bus along with the terminals. In such a situation, it may be more attractive for the SBS 36 to handle the stale feedback (from terminals 28-29) because it is closer and essentially immobile relative to the terminals. In an opposite situation, the PBS 34 may be moving, but the SBS 36 and the terminals 28-29 are not. This could be the case for a PBS on a utility truck communicating with home meters (e.g., electrical meters), or on a plane overflying an area and communicating with sensors (i.e., the terminals) on the ground. In this situation as well, it may be more attractive for the SBS 36 to handle the stale feedback because it could be placed closer to the immobile terminals and the SBS is again immobile relative to the terminals.

In one embodiment, the PBS 34 or the SBS 36 may have some knowledge of the reception quality of terminals 28-29. Unlike very short term variations in the signal envelope due to fading, the reception quality, in the form of signal strength, tends to change slowly over time. For instance, the base station can measure the uplink signal strength, and assume reasonably that it reflects the signal strength on the downlink. Alternatively, the base station may get reports from the terminal about the base station signal strength on the downlink. In this embodiment, if a certain terminal C (which may be either of the terminals 28-29 or another terminal (not shown) in the network 32 in FIG. 4) is expected to be in an advantaged position with good enough quality of signal reception (i.e., the terminal meeting a pre-determined threshold of signal reception quality), then there may be no need to help that terminal C (in the process of forming the V2RX at that terminal). In that case, the other terminals in the system 25 (i.e., terminals not meeting the pre-determined threshold of signal reception quality) may not have to "listen" during the scheduled transmission for terminal C and may not have to feed back to the SBS 36 any terminal-specific CSI in response to that transmission. The SBS 36 may be configured to handle such selective reception and transmission, and may not include the information for terminal C in its additional broadcast (i.e., the transmission of a combined symbol, such as the symbol given by equation (5)). In other words, the SBS 36 may broadcast the combined symbol that may include CSI feedback received from terminal C along with symbols transmitted by PBS to terminal C, but may not include (or even receive) that CSI information or PBS-transmitted symbols which terminal C may need to form a V2RX (because of terminal C's advantageous position as to signal reception). Either the SBS 36 or the PBS 34 may acquire knowledge about reception quality of each terminal in the system 25, and signal to the terminals (e.g., via one or more messages on a control channel) when they should "listen" and feed back CSI (to the SBS 36). For example, the base station 34 or 36 (as the case may be) may instruct the terminals 28-29 via a control channel such as, for example, the earlier-mentioned PDCCH in an LTE network, as to when it should "listen" and send its CSI. There may be no need for any specific coordination between the SBS 36 and the PBS 34 to accomplish such selective receptions and transmissions.

In another embodiment, the PBS 34 or the SBS 36 may have some knowledge about which terminals in the system 25 have good relative diversity, and consequently would benefit from helping one another (i.e., terminals that can be paired together). The term "relative diversity" may indicate that the terminal signals tend to fade independently from each other over time. For instance, the base station may measure the envelope of the received signals on the uplink from various terminals, and compute a correlation between the envelopes of pairs of signals as an indicator of relative diversity. Alternatively, the base station may get reports from the terminals about the measured signal envelope on the downlink. The base station may then use reports from pairs of terminals to compute the envelope correlation. Low correlation indicates high diversity, and vice versa. Recall that the end result is to form a V2RX, which is more effective when the received signals have high diversity. Thus it is desirable to pair terminals when their signals exhibit high relative diversity. This diversity knowledge may be exploited (by either PBS or the SBS) to pair terminals in the V2RX scheme. Like the terminal reception quality-based selective CSI reception and combined-symbol transmission case discussed earlier, either the PBS 34 or the SBS 36 can acquire knowledge about terminal relative diversity, and signal to the terminals (e.g., via one or more messages on a control channel such as the PDCCH in an LTE network) when they should "listen" and feed back CSI (to the SBS 36). Here as well, there may be no need for any specific coordination between the SBS 36 and the PBS 34 to accomplish such terminal pairing.

It is noted here that the secondary base station-based stale feedback reception scheme according to one embodiment of the present invention may work equally well in a Frequency Division Duplex (FDD) or Time Division Duplex (TDD) setting.

Figure 7:
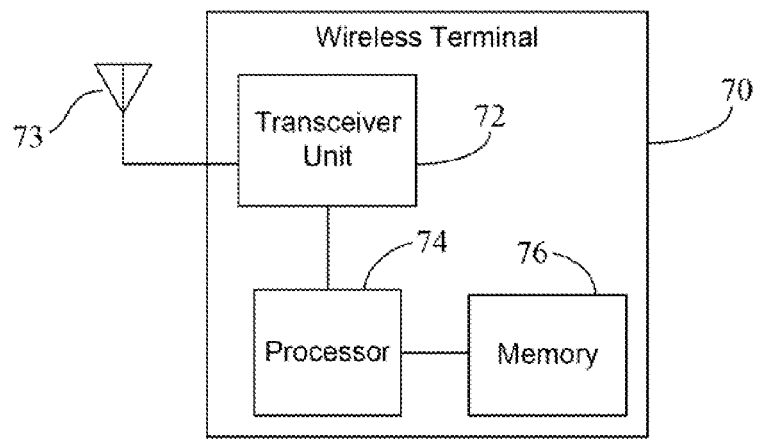
FIG. 7 is a block diagram of an exemplary wireless terminal according to one embodiment of the present invention.

FIG. 7 is a block diagram of an exemplary wireless terminal 70 according to one embodiment of the present invention. The terminal 70 may represent either of the terminals 28, 29 in FIG. 4. The terminal 70 may include a transceiver 72, an antenna 73, a processor 74, and a memory 76. In particular embodiments, some or all of the functionalities described above (e.g., reception of transmissions from the primary and secondary base stations 34, 36, respectively, using the antenna 73 and transceiver 72; storage of the received transmission in the memory 76 prior to processing the transmission using the processor 74 to recover symbols sent therethrough; transmission of CSI reports to the secondary base station 36 using transceiver 72 and antenna 73; etc.) as being provided by wireless terminals or other forms of mobile communication devices may be provided using the processor 74 executing instructions stored on a computer-readable medium, such as the memory 76 shown in FIG. 7. Alternative embodiments of the terminal 70 may include additional components beyond those shown in FIG. 7 that may be responsible for enabling the terminal's 70 communication with the base stations 34, 36 in the network 32 and for providing certain aspects of the terminal's functionality, including any of the functionality described above and/or any functionality necessary to support the solution described above.

Figure 8:
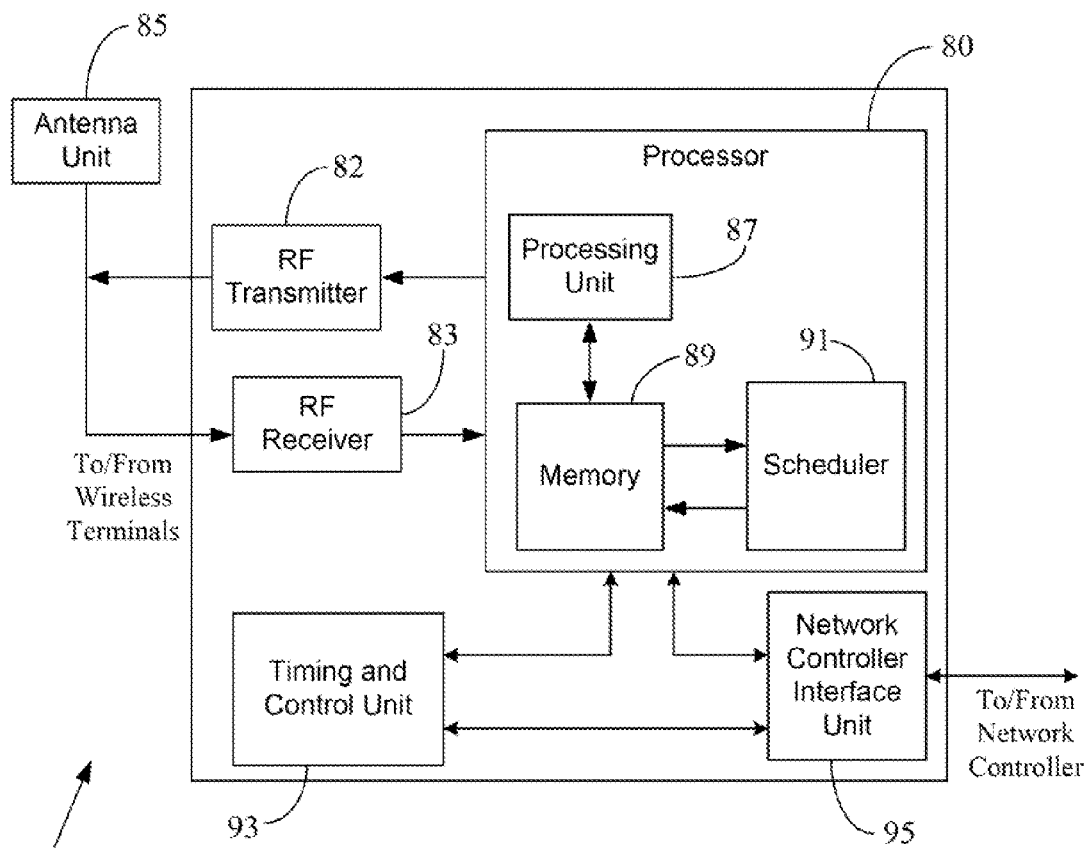
FIG. 8 is a block diagram of an exemplary communication node or base station according to one embodiment of the present invention.

FIG. 8 is a block diagram of an exemplary communication node or base station 78 according to one embodiment of the present invention. The block diagram in FIG. 8 is general in nature, and may represent architectural details of either of the base stations 34, 36, with suitable modifications (if necessary). For example, in case of the PBS 34, the antenna unit 85 in FIG. 8 may include two antennas 37-38, whereas if the base station 78 represents the SBS 36, then the antenna unit may include a single antenna—i.e., antenna 40. As another example, if the base station 78 represents the SBS 36 and if the SBS 36 is not coupled to the network controller 50, then the network controller interface unit 95 may be absent in the block diagram of the base station 78. Although all such distinctions between individual implementations of the PBS 34 and SBS 36 in view of the general architecture of the base station 78 are not listed herein, it is evident that the general details in FIG. 8 may be suitably modified in the context of implementation of the base station 78—i.e., whether it is implemented as the PBS 34 or the SBS 36. Thus, the discussion below is general in nature and is provided with reference to the base station 78. As mentioned here, any PBS- or SBS-specific implementational modifications to the general architecture shown in FIG. 8 may be carried out as desired, and are not discussed in detail herein.

Referring now to FIG. 8, the base station 78 may include a processor 80 to provide radio interface with the wireless terminals 28-29 (in the carrier network 32) via base station's Radio Frequency (RF) transmitter 82 and RF receiver 83 units, which are coupled to the antenna unit 85. The processor 80 may be configured (in hardware and/or software) to transmit terminal-specific symbols (or the combined symbol, as may be the case) to the terminals 28-29. In one embodiment, the processor 80 may receive stale CSI feedbacks from the terminals 28-29 via the antenna unit 85 and receiver 83, whereas base station's 78 transmissions to the terminals 28-29 may be carried out via the transmitter 82 and antenna unit 85. The processor 80 may include a processing unit 87 in communication with a memory 89 to process and store relevant information. A scheduler (e.g., the scheduler 91 in FIG. 8) in the base station 78 may provide the uplink transmission scheduling decisions for the terminals 28-29 based on a number of factors such as, for example, QoS (Quality of Service) parameters, terminal's buffer/memory status, uplink CSI report received from the terminal, terminal's processing capabilities, etc. In one embodiment, the scheduler 91 may have the same data structure as a typical scheduler in an eNB in an LTE system.

The processor 80 may also provide additional baseband signal processing (e.g., terminal registration, radio resource management, etc.) as required. The processor 80 (and, more particularly, the processing unit 87) may perform additional signal/data processing tasks as well, such as, for example, determination of reception quality of the terminals 28-29, determination of terminal relative diversity, instructing terminal(s) as to when they should "listen" and feed back their CSI, etc. The processing unit 87 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above as being provided by a base station (whether primary or secondary), a base station controller, a node B, an evolved node B, an HeNB, a home base station, a femtocell base station, and/or any other type of communication node may be provided by the processing unit 87 executing instructions stored on a computer-readable data storage medium, such as the memory 89 shown in FIG. 8.

The base station 78 may further include a timing and control unit 93 and a network controller interface unit 95 as illustrated in FIG. 8. The control unit 93 may monitor operations of the processor 80 and the interface unit 95, and may provide appropriate timing and control signals to these units. The interface unit 95 may provide a bi-directional interface for the base station 78 to communicate with the network controller 50 to facilitate administrative, call-management, and external resource-management functions for the base station 78 and the wireless terminals 28-29 operating in the carrier network 32.

Alternative embodiments of the base station 78 may include additional components responsible for providing additional functionality, including any of the functionality identified above and/or any functionality necessary to support the solution described above. Although features and elements are described above in particular combinations, each feature or element can be used alone without the other features and elements or in various combinations with or without other, features and elements. The methodology provided herein (related to reception and usage of stale CSI) may be implemented in a computer program, software, or firmware incorporated in a computer-readable storage medium (e.g., the memory 89 in FIG. 8) for execution by a general purpose computer or a processor (e.g., the processing unit 87 in FIG. 8). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs).

The foregoing describes a system and method in which two base stations—a PBS and an SBS—are used to accomplish a V2RX scheme. The PBS may perform the initial transmissions of symbols, but, instead of the PBS, the SBS may handle the subsequent reception of terminal-specific CSI and the broadcast of the additional signal. This division of tasks between the PBS and SBS may free up the PBS to do other important tasks. Because SBS's role is limited, the SBS can be much simpler in design than the PBS. Furthermore, the SBS can be located physically closer to the terminals, requiring less power for the feedback signals (from the terminals) and also for SBS's own broadcast of the additional signal to terminals. This lower power requirement can effectively help the overall performance of the cell in which the PBS and SBS are operating. The reception and usage of stale CSI using a secondary base station can be important for dense networks with a large number of simple terminals having a single antenna, a noisy front end, limited processing capability, and slow feedback. This makes the boost in terminal's as well as overall system's performances afforded by particular embodiments of the present invention particularly useful.

In particular embodiments the described techniques for receiving and using stale CSI using a secondary base station may be applied, with suitable modifications (as may be apparent to one skilled in the art using the present teachings), to a number of different wireless systems or networks, such as, for example, networks/systems using 3G/4G specifications. Some examples of such systems or networks include, but not limited to, Global System for Mobile communications (GSM) networks, LTE networks, LTE-Advanced networks, UTRAN/E-UTRAN networks, Wideband Code Division Multiple Access (WCDMA) systems, WCDMA-based High Speed Packet Access (HSPA) systems, CDMA2000 systems, GSM/Enhanced Data Rate for GSM Evolution (GSM/EDGE) systems, Evolution-Data Optimized (EV-DO) systems, and Worldwide Interoperability for Microwave Access (WiMAX) systems.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of providing wireless transmissions in a wireless network wherein a first base station and a second base station are in wireless communication with each other and with each of a first terminal and a second terminal operating in the wireless network, the method comprising the steps of:

using the first base station, providing a terminal-specific wireless transmission to each of the first and the second terminals over a communication channel established in the wireless network; and using only the second base station:

receiving the terminal-specific wireless transmissions transmitted to each of the first and the second terminals from the first base station;

receiving respective terminal-specific channel status-related information from at least one of the first and the second terminals in response to at least one corresponding terminal-specific wireless transmission from the first base station; and transmitting a signal to the at least one terminal from which the channel status-related information was received, wherein the transmitted signal from the second base station is based on the channel status-related information received by the second base station from the at least one terminal, and on the corresponding terminal-specific wireless transmission transmitted to the at least one terminal from the first base station, thereby enabling the at least one terminal to form a Virtual 2-antenna Receiver (V2RX).

2. The method of claim 1, wherein the communication channel is a Radio Frequency (RF) channel.

3. The method of claim 1, further comprising the step of:
using either the first or the second base station, grouping the first and the second terminals in a pair based on relative diversity therebetween.

4. A method of providing wireless transmissions in a wireless network wherein a first base station and a second base station are in wireless communication with each of a first terminal and a second terminal operating in the wireless network, the method comprising the steps of:

using the first base station, providing a terminal-specific wireless transmission to each of the first and the second terminals over a communication channel established in the wireless network; and using only the second base station, receiving respective terminal-specific channel status-related information from at least one of the first and the second terminals in response to corresponding terminal-specific wireless transmission from the first base station;

wherein the first base station includes a pair of transmit antennas, and wherein the step of providing the terminal-specific wireless transmission includes:

using the first base station, providing a first pair of antenna-specific wireless transmissions intended for the first terminal at a first time over the communication channel; and using the first base station, providing a second pair of antenna-specific wireless transmissions intended for the second terminal at a second time over the communication channel; and wherein the step of receiving respective terminal-specific channel status-related information includes:

using only the second base station, receiving respective terminal-specific channel status-related information from at least one of the first and the second terminals, wherein the terminal-specific channel-status related information includes one or more of the following:

information received from the second terminal related to the status of the communication channel at the first time; and information received from the first terminal related to the status of the communication channel at the second time.

5. The method of claim 4, wherein the pair of transmit antennas includes a first antenna and a second antenna, wherein the step of providing the first pair of antenna-specific wireless transmissions includes:

using the first antenna, at the first time, transmitting over the communication channel a first symbol intended for the first terminal; and using the second antenna, at the first time, transmitting over the communication channel a second symbol intended for the first terminal; and wherein the step of providing the second pair of antenna-specific wireless transmissions includes:

using the first antenna, at the second time, transmitting over the communication channel a third symbol intended for the second terminal; and using the second antenna, at the second time, transmitting over the communication channel a fourth symbol intended for the second terminal.

6. The method of claim 5, wherein the step of receiving the terminal-specific channel status-related information from the first and the second terminals includes:

using the second base station, receiving a first Channel State Information (CSI) feedback from the second terminal including estimates of a first pair of antenna-specific parameters related to the status of the communication channel at the first time; and using the second base station, receiving a second CSI feedback from the first terminal including estimates of a second pair of antenna-specific parameters related to the status of the communication channel at the second time.

7. The method of claim 6, further comprising the step of:
using the second base station, broadcasting a combined symbol to the first and the second terminals at a third time so as to enable each of the first and the second terminals to form a respective Virtual 2-antenna Receiver (V2RX), wherein the combined symbol includes the first and the second CSI feedbacks along with information related to the first and the second pairs of antenna-specific wireless transmissions.

8. The method of claim 7, wherein the step of broadcasting the combined symbol includes:

using the second base station, receiving the first and the second pairs of antenna-specific wireless transmissions provided by the first base station;

using the second base station, determining the first and the second symbols received as part of the first pair of antenna-specific wireless transmissions;

using the second base station, determining the third and the fourth symbols received as part of the second pair of antenna-specific wireless transmissions; and using the second base station, generating the combined symbol containing a summation of a plurality of products, wherein each product is a multiplication of an antenna-specific parameter from the first and the second pairs of antenna-specific parameters with a corresponding one of the first, second, third, and fourth symbols.

9. The method of claim 8, wherein determining the first, second, third, and fourth symbols includes one of the following:

using the second base station, recovering the first, second, third, and fourth symbols from the received first and second pairs of antenna-specific wireless transmissions;

using the second base station, decoding the received first and second pairs of antenna-specific wireless transmissions to obtain contents of the first, second, third, and fourth symbols; and using the second base station, computing expected values of the first, second, third, and fourth symbols using symbol-specific probability distribution.

10. The method of claim 4, further comprising the steps of:

using either the first or the second base station, determining which of the first and the second terminals has signal reception quality meeting a pre-determined threshold; and using that base station which determined terminal-specific signal reception quality, instructing the terminal having signal reception quality not meeting the pre-determined threshold to not transmit the terminal-specific channel status-related information to the second base station.

11. The method of claim 10, further comprising the step of:

using the second base station, sending, at a third time, a combined symbol at least to the terminal having signal reception quality not meeting the pre-determined threshold so as to enable that terminal to form a respective Virtual 2-antenna Receiver (V2RX), wherein the combined symbol includes the terminal-specific channel status-related information received by the second base station from the terminal having signal reception quality meeting the pre-determined threshold along with information related to one of the first and the second pairs of antenna-specific wireless transmissions provided to that terminal.

12. In a method of forming a respective Virtual 2-antenna Receiver (V2RX) at a first terminal and a second terminal that are in wireless communication with a first base station via a communication channel established in a wireless network, the improvement comprising:

providing a second base station in the wireless network, wherein the second base station is in wireless communication with the first and the second terminals; and configuring the second base station to receive a respective Channel State Information (CSI) feedback from each of the first and the second terminals, wherein each respective CSI feedback relates to a terminal-specific transmission to a corresponding one of the first and the second terminals from the first base station over the communication channel, and wherein each terminal-specific transmission temporally precedes the respective terminal-specific CSI feedback.

13. The method of claim 12, wherein the improvement further comprises:

configuring each of the first and the second terminals to supply the respective CSI feedback only to the second base station.

14. The method of claim 12, wherein the second base station is in further wireless communication with the first base station, and wherein the improvement further comprises:

further configuring the second base station to broadcast a signal to each of the first and the second terminals over the communication channel, wherein the broadcast signal from the second base station is based on the respective CSI feedbacks received by the second base station from the first and the second terminals and the terminal-specific transmissions to the first and the second terminals received by the second base station from the first base station, thereby enabling each of the first and the second terminals to form the respective V2RX.

15. A system comprising:

a first communication node configured to be in wireless communication with each of a first terminal and a second terminal operating in a wireless network, wherein the first communication node is further configured to provide a terminal-specific wireless transmission to each of the first and the second terminals over a communication channel established in the wireless network; and a second communication node configured to be in wireless communication with each of the first and the second terminals, wherein the second communication node is further configured to receive respective terminal-specific Channel State Information (CSI) feedback from at least one of the first and the second terminals in response to corresponding terminal-specific wireless transmission from the first communication node;

wherein the second communication node is further configured to be wirelessly linked with the first communication node, and wherein the second communication node is configured to perform the following:

receive each terminal-specific wireless transmission from the first communication node; and broadcast a signal to each of the first and the second terminals over the communication channel, wherein the broadcast signal from the second communication node is based on the respective CSI feedback received by the second communication node from at least one of the first and the second terminals and the terminal-specific transmissions to the first and the second terminals received by the second communication node from the first communication node, thereby enabling each of the first and the second terminals to form a respective Virtual 2-antenna Receiver (V2RX).

16. The system of claim 15, further comprising:

the first terminal; and the second terminal, wherein each of the first and the second terminals is configured to provide respective terminal-specific CSI feedback only to the second communication node, wherein each respective CSI feedback relates to a terminal-specific wireless transmission to a corresponding one of the first and the second terminals from the first communication node over the communication channel, wherein each terminal-specific transmission temporally precedes the respective terminal-specific CSI feedback.

17. The system of claim 16, wherein the wireless network is a Radio Frequency (RF) network.

* * * * *